(12) United States Patent
Nordberg et al.

(10) Patent No.: US 8,066,508 B2
(45) Date of Patent: Nov. 29, 2011

(54) ADAPTIVE SPARK IGNITION AND FLAME SENSING SIGNAL GENERATION SYSTEM

(75) Inventors: Timothy J. Nordberg, Plymouth, MN (US); Brent Chian, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 1966 days.

(21) Appl. No.: 10/908,467

(22) Filed: May 12, 2005

(65) Prior Publication Data
US 2006/0257805 A1  Nov. 16, 2006

(51) Int. Cl.
*F23N 5/00* (2006.01)
(52) U.S. Cl. ............... 431/75; 431/76; 431/77; 431/24; 431/25
(58) Field of Classification Search .............. 431/18, 431/75, 77–78, 24–26; 361/247, 253, 256, 361/257, 230, 232
See application file for complete search history.

(56) References Cited

U.S. PATENT DOCUMENTS

| | | | |
|---|---|---|---|
| 3,425,780 A * | 2/1969 | Potts ............................. | 431/68 |
| 3,520,645 A * | 7/1970 | Cotton et al. ................. | 431/78 |
| 3,649,156 A * | 3/1972 | Conner ......................... | 431/78 |
| 3,681,001 A * | 8/1972 | Potts ............................ | 431/264 |
| 3,836,857 A * | 9/1974 | Ikegami et al. .............. | 307/653 |
| 3,909,816 A | 9/1975 | Teeters | |
| 4,157,506 A | 6/1979 | Spencer | |
| 4,221,557 A | 9/1980 | Jalics | |
| 4,242,079 A * | 12/1980 | Matthews ..................... | 431/46 |
| 4,269,589 A * | 5/1981 | Matthews ..................... | 431/46 |
| 4,280,184 A | 7/1981 | Weiner et al. | |
| 4,303,385 A * | 12/1981 | Rudich et al. ................ | 431/70 |
| 4,370,557 A | 1/1983 | Axmark et al. | |
| 4,450,499 A * | 5/1984 | Sorelle ......................... | 361/253 |
| 4,457,692 A * | 7/1984 | Erdman ........................ | 431/19 |
| 4,483,672 A | 11/1984 | Wallace et al. | |
| 4,521,825 A * | 6/1985 | Crawford ..................... | 361/253 |

(Continued)

FOREIGN PATENT DOCUMENTS
EP  0967440  12/1999
(Continued)

OTHER PUBLICATIONS www.playhookey.com, "Series LC Circuits," 5 pages, printed Jun. 15, 2007.

(Continued)

*Primary Examiner* — Thomas Denion
*Assistant Examiner* — Daniel Bernstein
(74) *Attorney, Agent, or Firm* — Seager, Tufte & Wickham LLC

(57) ABSTRACT

A signal generation system for flame ignition and sensing. The ignition signal generation is adaptive for improving flame ignition while eliminating excess energy usage. High voltage signals for flame sensing may also be provided. If more energy or speed is needed for ignition signal generation, then the flame sensing signal generation portion may be disabled to increase the amount of available energy. Adaptation for ignition signal generation may be guided by the results of flame sensing. The flame sensing voltage may be regulated based on the flame current strength. The flame current may be controlled within an optimum range to reduce rod contamination rate and yet provide reliable flame sensing when the rod contamination built up. The adaptation may be algorithmic-based with the facilitation of a microcontroller. The system may provide the high voltage signals from a low voltage power supply, such as that of 24 VAC.

8 Claims, 7 Drawing Sheets

U.S. PATENT DOCUMENTS

| | | |
|---|---|---|
| 4,527,247 A | 7/1985 | Kaiser et al. |
| 4,555,800 A | 11/1985 | Nishikawa et al. |
| 4,655,705 A | 4/1987 | Shute et al. |
| 4,672,324 A | 6/1987 | van Kampen |
| 4,695,246 A | 9/1987 | Beilfuss et al. |
| 4,709,155 A | 11/1987 | Yamaguchi et al. |
| 4,777,607 A | 10/1988 | Maury et al. |
| 4,830,601 A | 5/1989 | Dahlander et al. |
| 4,842,510 A | 6/1989 | Grunden et al. |
| 4,843,084 A | 6/1989 | Parker et al. |
| 4,872,828 A | 10/1989 | Mierzwinski |
| 4,904,986 A | 2/1990 | Pinckaers |
| 4,949,355 A | 8/1990 | Dyke et al. |
| 4,955,806 A | 9/1990 | Grunden et al. |
| 5,026,270 A | 6/1991 | Adams et al. |
| 5,026,272 A | 6/1991 | Takahashi et al. |
| 5,037,291 A | 8/1991 | Clark |
| 5,073,769 A | 12/1991 | Kompelien |
| 5,077,550 A | 12/1991 | Cormier |
| 5,112,117 A | 5/1992 | Ripka et al. |
| 5,126,721 A | 6/1992 | Butcher et al. |
| 5,158,477 A | 10/1992 | Geary |
| 5,175,439 A | 12/1992 | Harer et al. |
| 5,222,888 A | 6/1993 | Jones et al. |
| 5,236,328 A | 8/1993 | Tate et al. |
| 5,255,179 A | 10/1993 | Zekan et al. |
| 5,276,630 A | 1/1994 | Baldwin et al. |
| 5,280,802 A | 1/1994 | Comuzie, Jr. |
| 5,300,836 A | 4/1994 | Cha |
| 5,347,982 A * | 9/1994 | Binzer et al. .................. 126/503 |
| 5,365,223 A | 11/1994 | Sigafus |
| 5,391,074 A | 2/1995 | Meeker |
| 5,424,554 A | 6/1995 | Marran et al. |
| 5,446,677 A | 8/1995 | Jensen et al. |
| 5,472,336 A | 12/1995 | Adams et al. |
| 5,506,569 A | 4/1996 | Rowlette |
| 5,567,143 A | 10/1996 | Servidio |
| 5,599,180 A * | 2/1997 | Peters et al. .................... 431/13 |
| 5,682,329 A | 10/1997 | Seem et al. |
| 5,722,823 A * | 3/1998 | Hodgkiss ........................ 431/43 |
| 5,797,358 A | 8/1998 | Brandt et al. |
| 5,971,745 A | 10/1999 | Bassett et al. |
| 6,060,719 A | 5/2000 | DiTucci et al. |
| 6,071,114 A | 6/2000 | Cusack et al. |
| 6,084,518 A | 7/2000 | Jamieson |
| 6,222,719 B1 * | 4/2001 | Kadah ........................... 361/247 |
| 6,261,086 B1 | 7/2001 | Fu |
| 6,299,433 B1 | 10/2001 | Gauba et al. |
| 6,346,712 B1 | 2/2002 | Popovic et al. |
| 6,349,156 B1 | 2/2002 | O'Brien et al. |
| 6,356,827 B1 | 3/2002 | Davis et al. |
| 6,385,510 B1 | 5/2002 | Hoog et al. |
| 6,457,692 B1 | 10/2002 | Gohl, Jr. |
| 6,474,979 B1 * | 11/2002 | Rippelmeyer ................... 431/67 |
| 6,486,486 B1 | 11/2002 | Haupenthal |
| 6,509,838 B1 * | 1/2003 | Payne et al. .................... 340/579 |
| 6,552,865 B2 | 4/2003 | Cyrusian |
| 6,676,404 B2 | 1/2004 | Lochschmied |
| 6,743,010 B2 | 6/2004 | Bridgeman et al. |
| 6,782,345 B1 | 8/2004 | Siegel et al. |
| 6,794,771 B2 | 9/2004 | Orloff |
| 6,912,671 B2 | 6/2005 | Christensen et al. |
| 6,917,888 B2 | 7/2005 | Logvinov et al. |
| 7,088,137 B2 | 8/2006 | Behrendt et al. |
| 7,088,253 B2 * | 8/2006 | Grow ............................. 340/578 |
| 7,202,794 B2 | 4/2007 | Huseynov et al. |
| 7,241,135 B2 * | 7/2007 | Munsterhuis et al. .......... 431/12 |
| 7,255,285 B2 | 8/2007 | Troost et al. |
| 7,274,973 B2 | 9/2007 | Nichols et al. |
| 7,289,032 B2 | 10/2007 | Seguin et al. |
| 7,327,269 B2 * | 2/2008 | Kiarostami .................... 340/577 |
| 7,617,691 B2 | 11/2009 | Street et al. |
| 7,728,736 B2 | 6/2010 | Leeland et al. |
| 7,764,182 B2 | 7/2010 | Chian et al. |
| 7,768,410 B2 | 8/2010 | Chian |
| 7,800,508 B2 | 9/2010 | Chian et al. |
| 2002/0099474 A1 | 7/2002 | Khesin |
| 2003/0064335 A1 | 4/2003 | Canon |
| 2003/0222982 A1 | 12/2003 | Hamdan et al. |
| 2004/0209209 A1 | 10/2004 | Chodacki et al. |
| 2005/0086341 A1 | 4/2005 | Enga et al. |
| 2007/0159978 A1 | 7/2007 | Anglin et al. |
| 2007/0188971 A1 | 8/2007 | Chian et al. |
| 2009/0009344 A1 | 1/2009 | Chian |
| 2009/0136883 A1 | 5/2009 | Chian et al. |
| 2010/0013644 A1 | 1/2010 | McDonald et al. |
| 2010/0265075 A1 | 10/2010 | Chian |

FOREIGN PATENT DOCUMENTS

| | | |
|---|---|---|
| EP | 1148298 | 10/2001 |
| WO | 9718417 | 5/1997 |

OTHER PUBLICATIONS

Honeywell, "S4965 Series Combined Valve and Boiler Control Systems," 16 pages, prior to the filed of present application.

Honeywell, "SV9410/SV9420; SV9510/SV9520: SV9610/SV9620 SmartValve System Controls," Installation Instructions, 16 pages, 2003.

\* cited by examiner

ADAPTIVE SPARK IGNITION AND FLAME SENSING SIGNAL GENERATION SYSTEM

BACKGROUND

The invention pertains to ignition and sensing systems, and particularly to flame ignition and sensing systems. More particularly, the invention pertains to such systems having spark-type ignition.

The present application is related to the following indicated patent applications: entitled "Dynamic DC Biasing and Leakage Compensation", U.S. application Ser. No. 10/908,463, filed May 12, 2005; Ser. No. 10/908,465 entitled "Leakage Detection and Compensation System"; and entitled "Flame Sensing System", U.S. application Ser. No. 10/908,466, filed May 12, 2005; which are incorporated herein by reference.

SUMMARY

The invention is a flame sensing system having spark ignition.

DESCRIPTION

Figure 1:
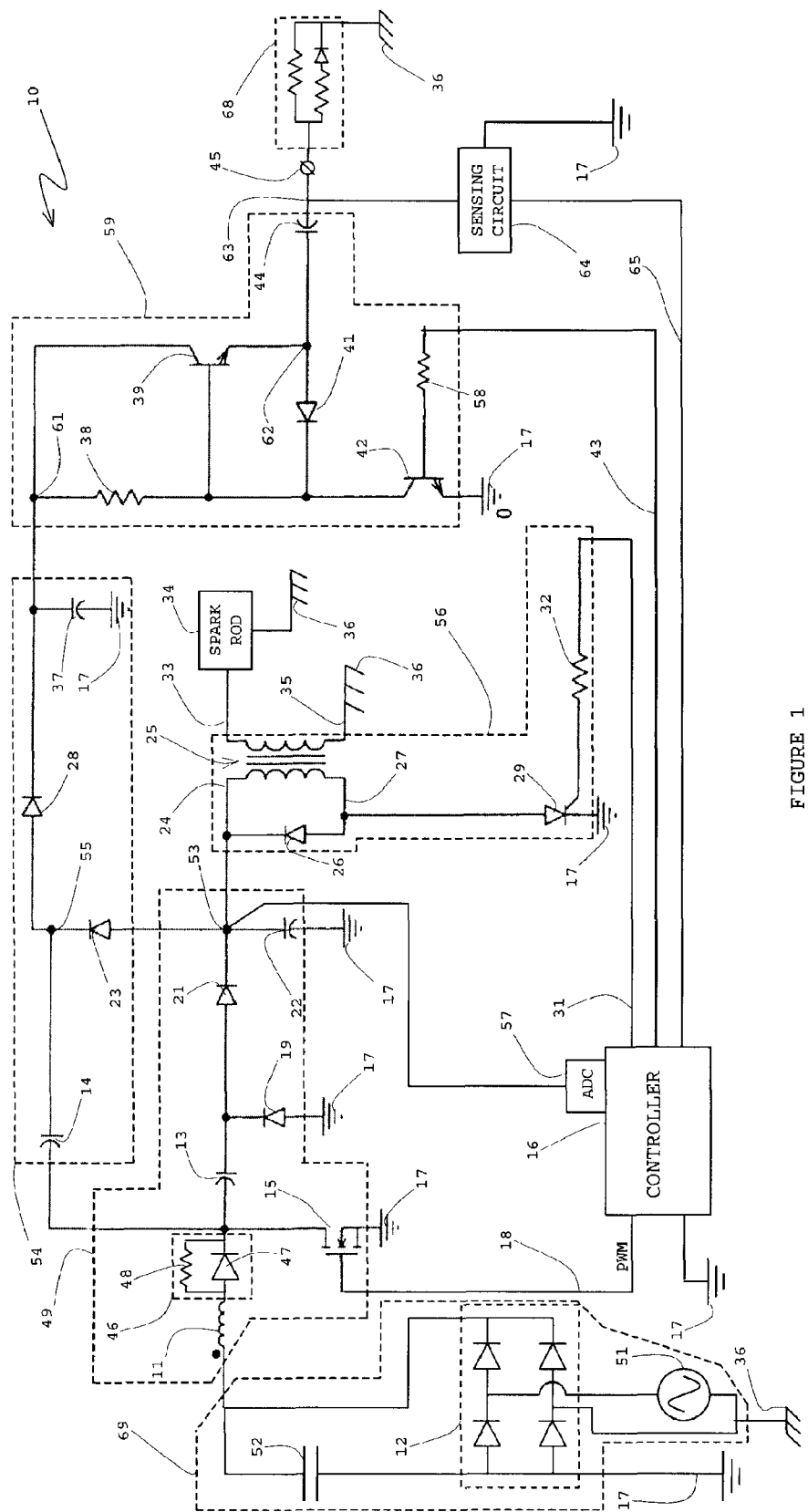
FIG. 1 is a schematic of an adaptive spark ignition and flame sensing signal generation system.

Relative to an automatic gas ignition system which uses sparking to ignite gas, the required spark energy and rate depend on various factors for successful ignition. Some of these factors may be application dependent or tied to environmental conditions such as humidity and temperature. A control of the system having an ability to adjust and adapt may easily overcome many of the things that adversely affect spark ignition. The system 10 of FIG. 1 may be powered by, for example, a 24 volt AC source 51. The 24 VAC may be connected to a full wave rectifier 12 with a capacitive filter 52 on the output to produce about 30 volts DC. Other configurations for providing electrical power to the system may be utilized. A high voltage may be needed for an ignition spark and a higher voltage yet may be needed for flame sensing.

The present system may have the capability to generate the needed high voltages and closely monitor the amount of energy applied for a given spark and check for the presence of a flame after doing such. This capability may include increasing spark energy in difficult lighting conditions, decreasing spark energy where extra energy may be unnecessary since it would only cause additional noise emission. This capability may also include an increasing spark rate for situations where a trial for ignition time is short and high spark energy alone does not provide for successful ignition.

The system 10 may also generate a voltage for sensing the presence of a flame after a spark attempt, thereby making it a very flexible system relative to input voltage requirements. The system may be able to control the flame sensing load by stopping an incorporated chopping circuit 59 when a quick charging of a spark capacitor 22 is necessary.

The circuit of system 10 of FIG. 1 shows circuits of both ignition and sensing. A voltage source 69 may include an AC source 51, a rectifier 12 and a filter 52. The AC source 51 outputting about 24 volts may be connected to the full-wave rectifier 12. One phase of the AC source may be connected to the appliance ground 36. The load filter capacitor 52 may be connected across the rectifier 12 output. An inductor 11 may have one end connected to about 30 volts DC from the full-wave rectifier 12, and the other end connected to an anode of a fast recovery diode 47 with about a 30 k ohm resistor 48 in parallel with the diode as shown by network 46 which may dampen the possibility of inductor 11 oscillating with the parasitic capacitance of diode 47. The cathode of the diode 47 may be connected to one end of a capacitor 13, one end of a capacitor 14, and a drain of a high voltage N-channel MOSFET 15. Capacitor 13 may be about 10 nanofarads. Capacitor 14 may have a capacitance of about 10 nanofarads.

A microcontroller 16 may have an output 18 connected to a gate of FET 15. Output 18 may be about a 31 kHz switching square wave signal to FET 15. Output 18 may be of other frequencies. Microcontroller 16 may have a ground line connected to terminal 17. A source of FET 15 may be connected to a ground terminal 17. The other end of capacitor 13 may be connected to a cathode of a diode 19 and an anode of a diode 21. The other end of capacitor 14 may be connected to the cathode of diode 23 and an anode of diode 28. The anode of diode 19 may be connected to the ground terminal 17. The cathode of diode 21 may be connected to one end of capacitor 22, the anode of diode 23, a terminal 24 of a primary winding of a step-up transformer 25, and a cathode of diode 26. Capacitor 22 may have a value of about one microfarad. The step-up transformer 25 may have a primary-to-secondary winding turn ratio of about 200. The anode of diode 26 may be connected to a terminal 27 of the primary winding of the transformer 25. The other end of capacitor 22 may be connected to the ground terminal 17. Inductor 11, FET 15, capacitor 13, diodes 19 and 21, and capacitor 22 may constitute a boost DC-DC step-up converter 49. Converter 49 may provide about a 150 volt potential at a node 53.

An SCR 29 may have an anode connected to terminal 27 of transformer 25 and a cathode connected to the ground terminal 17. Microcontroller 16 may have an output 31 connected to a gate of SCR 29 via a resistor 32.

A terminal 33 of a secondary winding of transformer 25 may be connected to a spark rod assembly 34. A terminal 35 of the secondary winding of transformer 25 may be connected to a spark rod ground 36. The spark rod assembly 34 may be connected to the rod ground 36.

The cathode of diode 28 may be connected to one end of a capacitor 37. The other end of capacitor 37 may be connected to the ground terminal 17. The cathode of diode 28 may also be connected to one end of a resistor 38 and to a collector of an NPN transistor 39. The other end of resistor 38 may be connected to a base of transistor 39, a cathode of diode 41, and a collector of an NPN transistor 42. The emitter of transistor 42 may be connected to the ground terminal 17. Microcontroller 16 may have an output 43 connected via a resistor 58 to a base of transistor 42. The emitter of transistor 39 may be connected to an anode of diode 41 and to one end of a capacitor 44. The other end of capacitor 44 may be an output 63 of system 10 connected to a flame sensing rod 45. Block 68 may be a resistor and diode network used to represent the flame.

System 10 may have an algorithm embedded in the microcontroller 16 with A/D (analog-to-digital converter) input and PWM (pulse width modulation) output capability. The microcontroller may use the PWM channel output 18 to control the high voltage MOSFET 15 such that, during the MOSFET on-time, energy may be built up in the inductor 11 in the form of a current. When the MOSFET is switched off, the energy may cause a significant voltage rise on the drain of MOSFET 15, thus dumping energy through capacitors 13 and 14, respectively, into capacitors 22 and 37. The process may repeat while the output capacitors are charged to a desired level. While the charging is taking place, the microcontroller 16 may monitor the voltage on capacitor 22 at node 53 via an analog-to-digital converter (ADC) 57 connection, and a simple voltage divider or other means (not shown), and control the charging rate and the voltage on the capacitors by varying the duty cycle of FET 15. Also, controller 1 6 may determine when to turn on SCR 29 based on the potential on node 53. The spark energy may be proportional to the square of the voltage on capacitor 22.

Once a trial for ignition is initiated, the microcontroller 16 may trigger the SCR 29 which dumps energy from capacitor 22 through the primary winding of the spark coil or transformer 25 thereby causing a high voltage to appear across the secondary winding of transformer 25 to provide a spark on the spark rod 34. The microcontroller 16 may then use a signal on line 65 from the flame sensing circuit 64 to determine if a flame is present or not, and then to adjust the spark energy accordingly with a rate control signal via line 31 to the gate of SCR 29 via resistor 32, and a magnitude control signal via line 18 to FET 15. Sensing circuit 64 may be connected to output 63 and ground 17. Also, a signal on line 43 may go to transistor 42 via resistor 58 to shut down the chopper circuit 59 to save energy in the circuit 49 for the spark ignition network or circuit 56.

Capacitor 13 may provide DC isolation for the spark circuit from the input voltage source 69. Without DC current blocking capacitor 13, once SCR 29 is triggered, SCR 29 could keep conducting and inductor 11 may be burned or ruined.

Capacitor 14, diode 23, diode 28 and capacitor 37 may form a voltage doubler 54. The voltage on capacitor 37 may be made roughly twice as high (e.g., about 300 volts) as the voltage on capacitor 22. About 150 volts may be across capacitors 14 and 22. With the diodes 23 and 28 in place, the voltage charges on capacitors 14 and 37 may be sustained and prevented from flowing back off the capacitors to nodes 53 and 55, respectively. An added advantage of the circuit 54 is that the voltage rating of FET 15 may not have to be as high as the voltage needed on capacitor 37. Thus, it is possible to use a low cost MOSFET as the FET 15. However, one may leave out the voltage multiplier or doubler circuit 54 and take a voltage directly from the voltage step-up circuit 49 and even if a higher rated switch or FET 15 is needed. Voltage adjustment on either of the voltage circuits may be effected by loading the output.

Transformer 25, diode 26, SCR 29 and gate resistor 32 may constitute a switching step-up voltage circuit 56 for providing sufficient voltage for spark ignition of gas at the spark rod 34. SCR 29 may be turned on to discharge a charge on the capacitor 22 through the primary winding of the transformer 25 to ground. At that time a high voltage pulse (about 12 k to 17 k volts) may appear on the secondary winding of transformer 25 and go to spark rod 34. Diode 26 may prevent a significant reverse current (i.e., from terminal 27 to terminal 24) appearing across the primary winding of the transformer 25. SCR 29 may be turned off when the current going through it goes to zero. The charging and switching cycle may be repeated. A periodic pulse from the controller 16 may go to the gate of SCR 29 to turn it on to achieve appropriate spark timing.

To perform flame sensing with system 10, the microcontroller 16 may chop the high voltage on node 61 from capacitor 37 for an output signal to the flame detector 45 with a square wave signal on line 43 via a base input resistor 58 to transistor 42 of a chopping or chopper circuit 59. The chopper circuit 59 may additionally consist of the transistor 39, resistor 38, diode 41 and DC blocking capacitor 44 at output 63. The output 63 may be connected to the flame detector 45. The signal 43 from microcontroller 16 may have a frequency of about 2.4 kHz. This frequency may range between 50 Hz and 200 kHz. When the signal 43 is positive, transistor 42 may be turned on to conduct some current from node 61 via resistor 38. That may provide a close to zero voltage on the base of transistor 39 effectively shutting it off and thereby reducing the signal at node 62 to nearly zero except for a diode drop or so. When the signal on line 43 is about zero or less, the transistor 42 may shut off and effectively reduce the amount of current, flowing from node 61 to ground 17 via transistor 42, to nearly zero. Then the voltage drop across resistor 38 may be negligible and a positive voltage may appear on the base of transistor 39 relative to its emitter. This positive voltage may turn on transistor 39 thereby resulting in a high voltage at node 62 nearly the same as the voltage on node 61. The waveform at node 62 may be a square wave with peaks at about 300 volts to about a diode drop above zero. At the output node 63, because of capacitor 44, the waveform may be symmetrical about zero volts with plus and minus 150 volt square peaks with a little droop down and up, respectively, with the degree of droop depending on the value of the capacitor 44 and an amount of flame sensor impedance. The signal frequency at the output 63 may be the same as the frequency of the signal input to the base of the transistor 42. The output signal may go to flame rod 45 for flame rectification.

The microcontroller 16 may monitor the amount of energy applied to a given spark and check for the presence of a flame via node 53 and line 65, respectively. Information about the spark energy and flame presence may enable the microcontroller 16 to increase or decrease spark energy via control on lines 18, 31 and 43 for difficult or easy lighting conditions. The spark rate may be increased by microcontroller 16 when room for ignition time is short and high spark energy does not solve an ignition difficulty. The chopper circuit 59 for flame sensing may be turned off to aid in faster charging of capacitor 22. The microcontroller 16 may be programmed to control various aspects of ignition and sensing of the system 10. Controller 16 may contain a control algorithm to effect various controls in the system for more efficient and effective igniting and sensing of a flame. The algorithm may be implemented with software or in another manner.

Independently from adjustment of applied spark energy, the invention above may include adaptive flame sensing with a constant-current mode. Given the capability to measure the strength of the flame signal from the flame sensing circuit 64, the microcontroller in this system may use control line 18 and feedback connection 57 to adjust the applied voltage to the flame sensing circuit. Applying lower voltage to a flame rod in flame rectification may significantly extend the life of the appliance, yet as contamination builds up on the flame rod 45, a higher voltage may be needed to detect the presence of a flame. Thus, with this circuit one may use the ADC connection 57 to sense voltage at node 53, and note that the voltage on capacitor 37 is close to double that of node 53 to control the voltage applied to the flame rod 45. An algorithm in the microcontroller may measure the flame strength seen from sensing circuit 64 and adjust the applied voltage through control line 18 such that the signal is always within a preprogrammed range. This algorithm may effectively produce a constant net flame current, increasing voltage only as necessary to break through contamination build up on the flame rod.

One may note that the spark and flame sensing would not occur at the same time. Therefore, the voltage at node 53 may be controlled to different levels at different time. For example, when higher spark energy is needed, the voltage at node 53 may be regulated at 170 volts or higher. After the flame is sensed, spark may be stopped. If the flame current is strong, the voltage at node 53 may be controlled at a much lower level, such as 70 volts, so that the voltage at node 61 is only about 140 volts, as long as the flame current sensed is still within the pre-determined range. The controller 16 may continuously sense the voltage at node 53 and adjust control line 18 to regulate voltage at node 53 to meet the dynamic voltage or energy needs required by the spark and flame sensing circuits.

Figure 2:
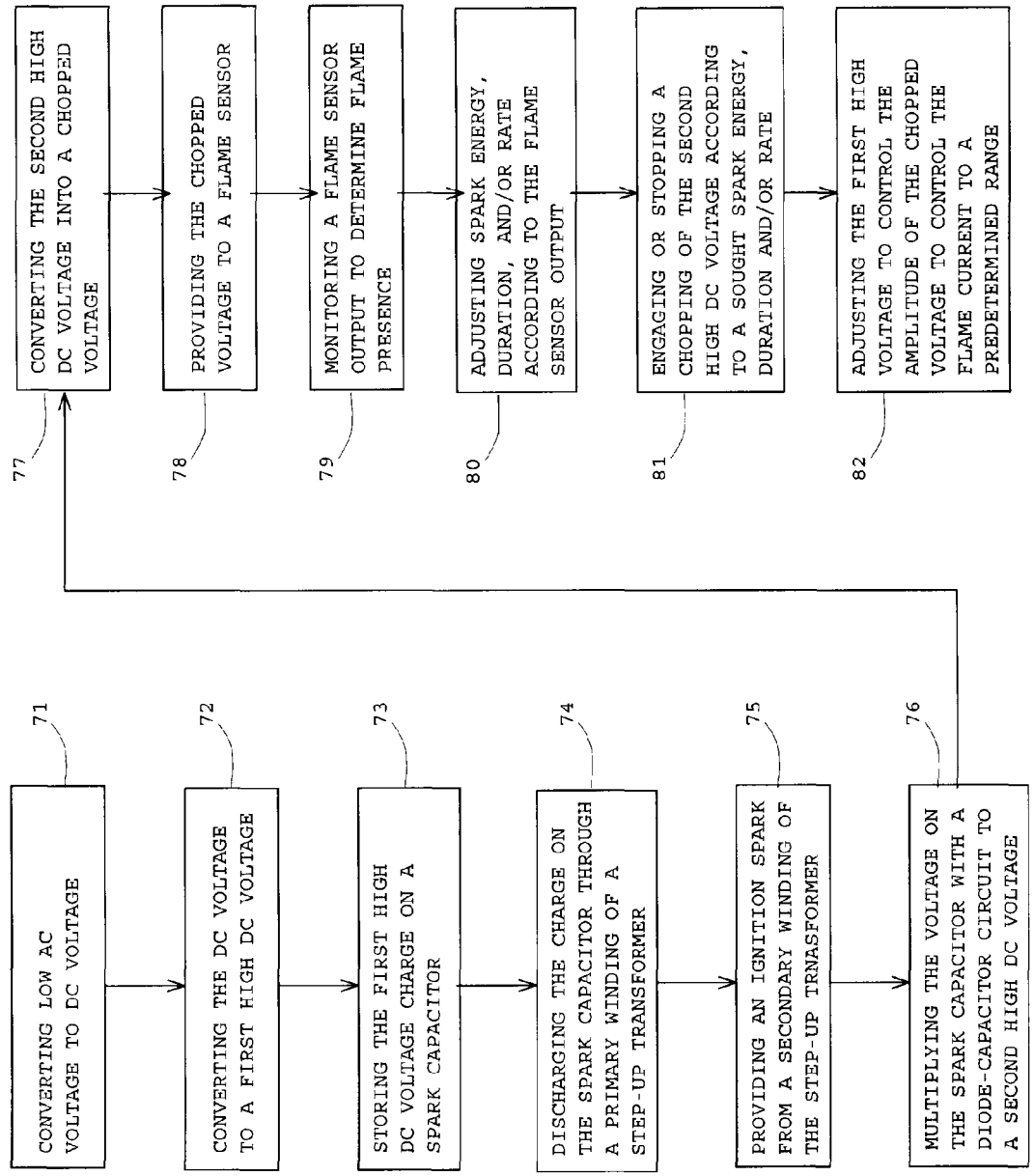
FIG. 2 is a flow diagram of activity in the signal generation system.

FIG. 2 is a block flow diagram of certain activity in the adaptive spark ignition and/or flame sensing signal generation system 10. The arrows show a flow of one block to another. The order shown is an illustrative example; however, the order may take various forms, and different kinds of activity may be indicated in the blocks. Block 71 indicates converting a low input AC voltage to a low DC voltage. Block 72 shows converting the low DC voltage to a first high DC voltage. Block 73 indicates storing the first high DC voltage charge on a spark capacitor. Block 74 shows discharging the charge on the spark capacitor through a primary winding of a step-up transformer. Block 75 indicates providing an ignition spark from a secondary winding of the step-up transformer. Block 76 shows multiplying the voltage on the spark capacitor with a diode-capacitor circuit to a second high DC voltage. Block 77 indicates converting the second high DC voltage into a chopped voltage. Block 78 shows providing the chopped voltage to a flame sensor. Block 79 indicates monitoring a flame sensor output to determine flame presence. Block 80 shows adjusting spark energy, duration, and/or rate according to the flame sensor output. Block 81 indicates engaging or stopping a chopping of the second high DC voltage as sought or desired according to the spark energy, duration and/or rate. Block 82 shows adjusting the first high voltage to control the amplitude of the chopped voltage to control the flame current to a predetermined range. In other words, regulating the first high DC voltage and the second high DC voltage may be done to control the amplitude of the chopped voltage to limit the flame current within the pre-determined range. Adjusting the first high voltage may directly affect the second high voltage to control the amplitude of the flame current.

Figure 3:
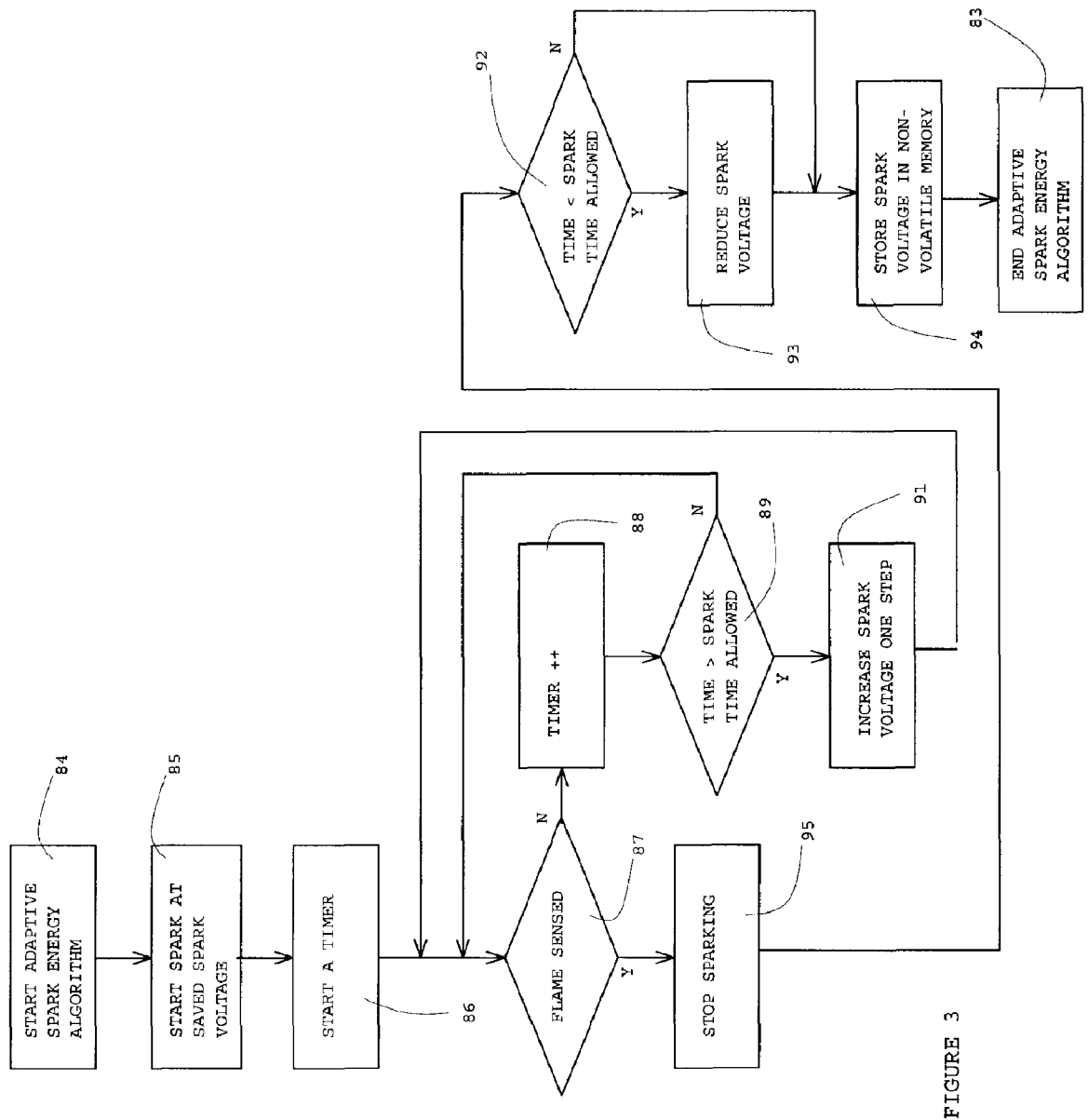
FIG. 3 is a flow diagram of a spark generation as it may be related to a burner.

FIG. 3 is a flow diagram of the spark generation as it may be related to a burner. An adaptive spark energy algorithm may be started in block 84. The spark may be started at a saved voltage as indicated in block 85. As the spark is started, a timer of block 86 may be started. A sensing of a flame may be checked in diamond 87. If a flame is not sensed, then the timer may be continued as indicated in block 88. The time on the timer may be noted to see if it exceeds the spark time allowed as indicated in diamond 89. If not, then one may again check for a flame in diamond 87. If the time is greater than the spark time allowed as in block 89, then the spark voltage may be increased one step as in block 91. After this, then one may again check for a flame in diamond 87. If the answer to whether the flame is sensed in diamond 87 is yes, then the sparking may be stopped as indicated in block 95. Then the time may be checked as to whether it is less than the time allowed or not in diamond 92. If not then storage may take place as in block 94. If so, then the spark voltage may be reduced in block 93 and then stored as in block 94. The adaptive spark energy algorithm may end in block 83.

Figure 4:
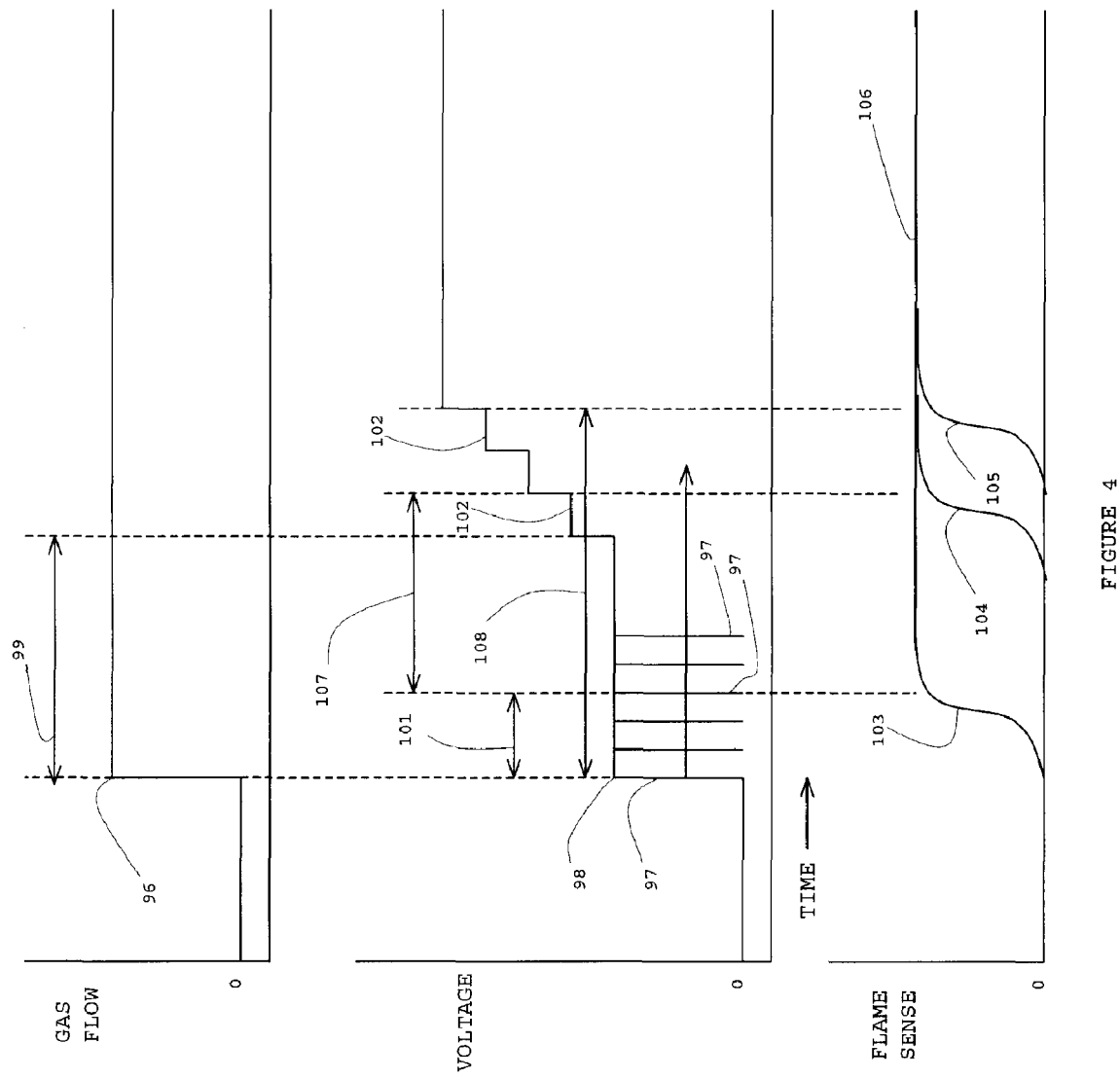
FIG. 4 is a graph of certain portions of FIG. 3.

FIG. 4 is a graph of certain items noted in FIG. 3. The start of a gas flow to a burner or the like is shown by waveform 96. The spark may be started about the same time as shown by the lines 97 and waveform 98. The spark may be continued for a period of time as shown by length 101 until a flame is sensed. The voltage applied to the spark mechanism may continue for about a time period as shown by length 99. That voltage may be sustained for about three seconds or any other amount of time as desired. If a flame is not sensed, the voltage may be incremented in steps as shown by the flow diagram of FIG. 3. Curves 103, 104 and 105 show examples of a start of flame presence. Curve 106 shows a sustained flame presence. The example flame curves 103, 104, and 105 have corresponding spark times of 101, 107, and 108 respectively.

Figure 5:
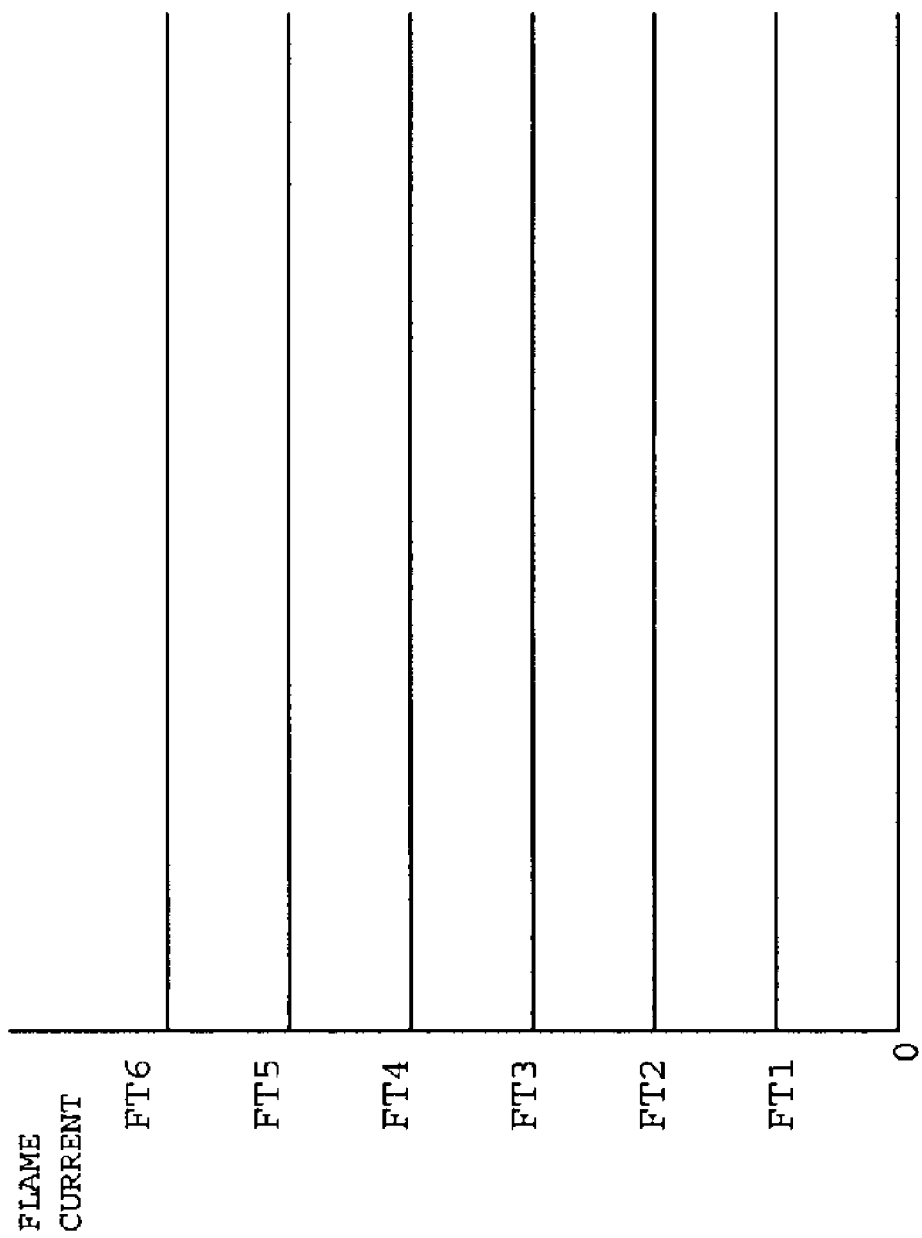
FIG. 5 shows various flame thresholds for flame sensing.

FIG. 5 shows the various flame thresholds (FT) for flame sensing. The first threshold FT1 may reveal flame loss or un-sensed presence of a flame. The second threshold FT2 may reveal a flame of the pilot level and here the sparking may cease. This may be regarded as a flame proved 1. The third threshold FT3 may be regarded as a flame proved 2. Here the pilot may be sufficient to light a burner. The fourth threshold FT4 may indicate a weak flame and the fifth threshold FT5 may indicate a flame low. The sixth threshold FT6 may indicate a flame high. In this invention the flame sense voltage may be adjusted to maintain the flame current between FT5 and FT6 by the algorithm previously described. Reduction of voltage may result in a lower contamination rate of the flame rod 45. A weak flame could indicate a significantly contaminated rod 45.

Figure 6:
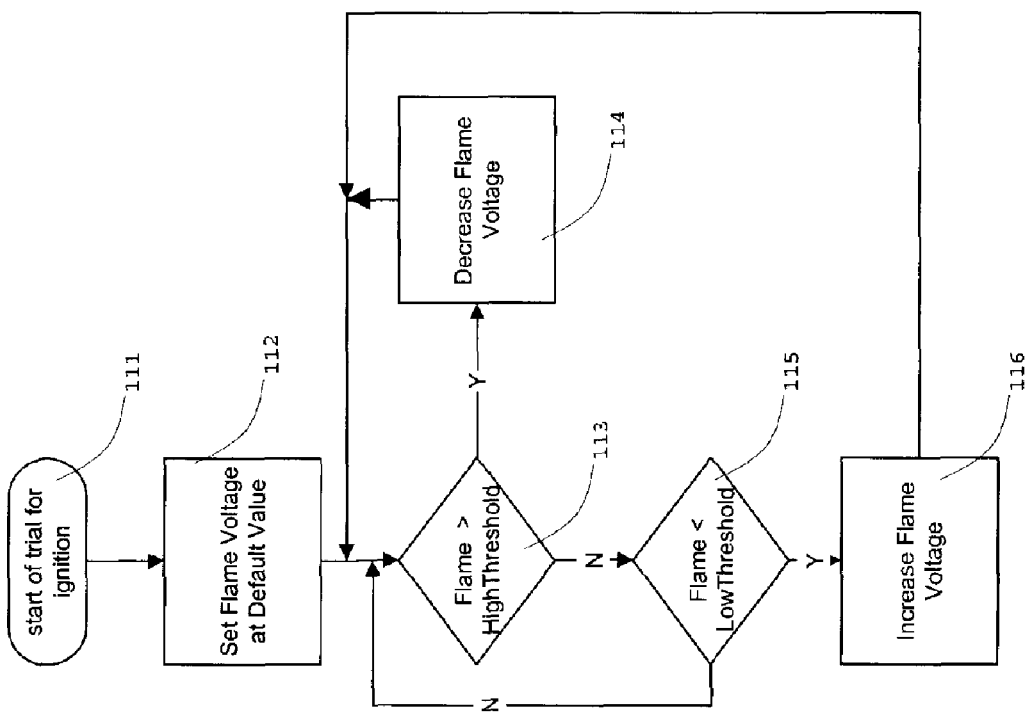
FIG. 6 is a flow diagram of an adaptive flame sensing approach.

FIG. 6 is a flow diagram of an adaptive flame sensing approach. It may begin with a start of trial of ignition 111 which may lead to a block 112 which sets the flame voltage at a default value. From block 112 may be question 113 whether the flame is greater than a high threshold. If the answer is yes, then the flame voltage may be decreased as shown in block 114. After this is the question 113 again as to whether the flame exceeds the high threshold. If the answer is no, then a question 115 of whether the flame is less than the low threshold may be asked. If the answer is no, the question 113 may be asked again. If the answer to the question 115 is yes, then the flame voltage may be increased as indicated in block 116. After block 116, then a return to the question of block 113 may be made again.

Figure 7:
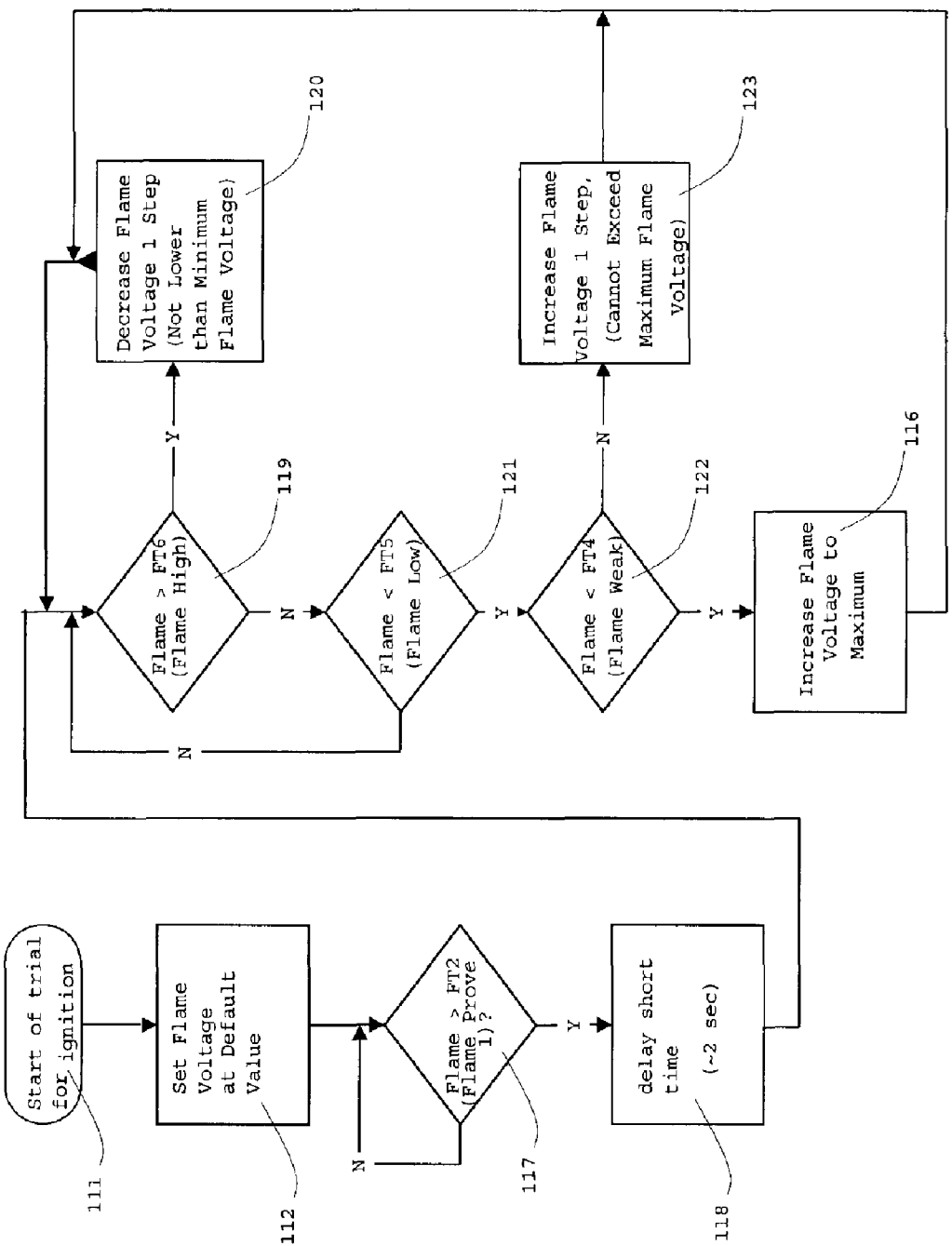
FIG. 7 is a flow diagram of a more detailed adaptive flame sensing approach.

FIG. 7 is a flow diagram of an adaptive flame sensing approach indicated in more detail than the one in FIG. 6. After the start of trial for ignition 111, the flame voltage may be set at a default value as indicated in block 112. Then a question 117 of whether the flame is greater than the flame prove 1 (FT2) may be asked. If the answer is no, then there may be a return to an input of the question 117. If the answer is yes, then there may be a delay of a short time (e.g., ~2 sec.) in block 118. After block 118, then a question 119 of whether the flame is greater than flame high (FT6) may be asked. If the answer is yes, then the flame voltage may be decreased by one step (the flame voltage should not be lower than the minimum flame voltage) in block 120. Then there may be return to the question 119. If the answer is no to question 119, then a question 121 of whether the flame is less than a flame low (FT5) may be asked. If the answer is no to question 121, then there may be a return to question 119. If the answer to question 121 is yes, then another question 122 of whether the flame is less than a flame weak (FT4) may be asked. If the answer is no, then block 123 may be proceeded to where the flame voltage may be increased one step (the maximum flame voltage is not to be exceeded). After block 123, then the question 119 may be asked and so on. If the answer to the question 122 is yes, then the flame voltage may be increased to a maximum in block 116. After block 116, then the question 119 may be asked again and so forth.

In the present specification, some of the matter may be of a hypothetical or prophetic nature although stated in another manner or tense.

Although the invention has been described with respect to at least one illustrative example, many variations and modifications will become apparent to those skilled in the art upon reading the present specification. It is therefore the intention that the appended claims be interpreted as broadly as possible in view of the prior art to include all such variations and modifications.

What is claimed is:

1. A signal generation system comprising:
a high voltage source;
a control circuit connected to the high voltage source;
a spark rod connected to the high voltage source; and
a sensing rod connected to the control circuit;
wherein:
a voltage from the high voltage source to the spark rod is adjustable for appropriate sparking at the spark rod to light a flame;
the voltage to the spark rod is increased until there is successful ignition;
the voltage to the spark rod is decreased to reduce electromagnetic interference;
a rate of voltage applications to the spark rod for sparking is adjustable;
the sensing rod feeds back a signal to the control circuit to indicate whether there is a successful sparking at the spark rod; and
the sensing rod is configured to be disabled to more quickly provide a voltage to the spark rod.

2. A signal generation system comprising:
a voltage source;
an ignition circuit connected to the voltage source, wherein the ignition circuit is configured to provide a spark voltage to a spark rod to ignite a gas, wherein ignition of the gas produces a flame;
a flame sensor, the flame sensor sensing a presence of the flame; and
a controller connected to the voltage source, the ignition circuit, and the flame sensor, wherein the controller selectively activates the ignition circuit when the voltage of the voltage source reaches a variable spark voltage, wherein if a flame is not sensed after a period of time, the controller increases the variable spark voltage;
wherein the controller includes a timer and, if an amount of time on the timer when the flame is sensed does not exceed the period of time, the variable spark voltage is reduced, and if the amount of time on the timer when the flame is sensed does exceed the period of time, then the variable spark voltage is not reduced.

3. The system of claim 2, wherein the controller includes a memory for storing the variable spark voltage.

4. A signal generation system comprising:
a direct current voltage source, wherein the direct current source is configured to receive an alternating current signal having a first voltage and convert the alternating current signal into a direct current signal having a second voltage that is higher than the first voltage;
a control circuit connected to the direct current voltage source, wherein the control circuit is configured to store a direct current voltage and to selectively discharge the stored direct current voltage; and
a spark rod connected to the voltage source, wherein the stored direct current voltage is selectively discharged by the control circuit when the stored direct current voltage reaches a variable spark voltage to energize the spark rod; and
wherein:
the stored direct current voltage from the direct current voltage source to the spark rod is adjustable for appropriate sparking at the spark rod to light a flame;
the variable spark voltage is increased until there is successful ignition; and
the variable spark voltage is decreased to reduce electromagnetic interference.

5. The system of claim 4, wherein a rate of voltage applications to the spark rod for sparking is adjustable.

6. The system of claim 5, further comprising:
a sensing rod connected to the control circuit; and
wherein the sensing rod feeds back a signal to the control circuit to indicate whether there is a successful sparking at the spark rod.

7. The system of claim 4, wherein the stored direct current voltage applied to the spark rod is adjusted by loading or unloading an output of the direct current voltage source.

8. A flame sensing system comprising:
a voltage source;
a flame sensor connected to the voltage source;
a controller connected to the voltage source and the flame sensor, wherein the controller increases a voltage to the flame sensor in response to a weak flame current to counter contamination of the flame sensor;
an ignition circuit connected to the controller and the voltage source; and
an adaptation mechanism for adjusting spark energy, duration and/or rate of a spark to be provided by the ignition circuit, according to at least one parameter; and
wherein the controller is configured to disconnect the flame sensor from the voltage source to facilitate the adjusting spark energy, duration and/or rate of a spark.

\* \* \* \* \*